United States Patent
Morita et al.

(10) Patent No.: US 10,251,126 B2
(45) Date of Patent: Apr. 2, 2019

(54) COMMUNICATION CONTROL METHOD, USER TERMINAL, AND PROCESSOR

(71) Applicant: KYOCERA CORPORATION, Kyoto (JP)

(72) Inventors: Kugo Morita, Yokohama (JP); Noriyoshi Fukuta, Inagi (JP)

(73) Assignee: KYOCERA Corporation, Kyoto (JP)

( * ) Notice: Subject to any disclaimer, the term of this patent is extended or adjusted under 35 U.S.C. 154(b) by 259 days.

(21) Appl. No.: 15/038,280

(22) PCT Filed: Nov. 25, 2014

(86) PCT No.: PCT/JP2014/081048
§ 371 (c)(1),
(2) Date: May 20, 2016

(87) PCT Pub. No.: WO2015/080079
PCT Pub. Date: Jun. 4, 2015

(65) Prior Publication Data
US 2016/0302152 A1    Oct. 13, 2016

(30) Foreign Application Priority Data
Nov. 26, 2013  (JP) .................................. 2013-244346

(51) Int. Cl.
*H04L 12/741*   (2013.01)
*H04W 52/02*   (2009.01)
(Continued)

(52) U.S. Cl.
CPC ........ *H04W 52/0219* (2013.01); *H04H 20/38* (2013.01); *H04J 11/00* (2013.01);
(Continued)

(58) Field of Classification Search
CPC ..................... H04W 52/0219; H04W 52/0212
(Continued)

(56) References Cited

U.S. PATENT DOCUMENTS

| | | | |
|---|---|---|---|
| 2005/0176440 A1* | 8/2005 | Sang | H04W 36/22 455/453 |
| 2006/0099984 A1* | 5/2006 | Brusch | H04W 52/34 455/522 |

(Continued)

OTHER PUBLICATIONS

International Search Report issued in PCT/JP2014/081048; dated Feb. 17, 2015.
(Continued)

*Primary Examiner* — Chi Tang P Cheng
(74) *Attorney, Agent, or Firm* — Studebaker & Brackett PC

(57) ABSTRACT

A communication control method according to the present embodiment is used in a mobile communication system that supports a D2D proximity service. The communication control method comprises: an operation step of performing an operation for energy saving by a base station managing a cell in which a fixed-type user terminal, whose movement is restricted, exists; and a switching step of switching an operation mode from a normal mode to a power saving mode, by the user terminal, so that power consumption of an operation in the D2D proximity service is reduced, when the base station performs the operation for energy saving.

17 Claims, 12 Drawing Sheets

(51) Int. Cl.
*H04H 20/38* (2008.01)
*H04J 11/00* (2006.01)
*H04L 12/26* (2006.01)
*H04W 4/02* (2018.01)
*H04W 40/24* (2009.01)
*H04W 56/00* (2009.01)
*H04W 60/02* (2009.01)
*H04W 72/12* (2009.01)
*H04W 8/00* (2009.01)
*H04L 12/70* (2013.01)
*H04W 88/08* (2009.01)
*H04W 88/16* (2009.01)
*H04W 76/14* (2018.01)

(52) U.S. Cl.
CPC ............ *H04L 43/16* (2013.01); *H04W 4/023* (2013.01); *H04W 40/246* (2013.01); *H04W 52/0212* (2013.01); *H04W 56/002* (2013.01); *H04W 60/02* (2013.01); *H04W 72/1215* (2013.01); *H04L 2012/5625* (2013.01); *H04W 8/005* (2013.01); *H04W 76/14* (2018.02); *H04W 88/08* (2013.01); *H04W 88/16* (2013.01); *Y02D 70/1262* (2018.01); *Y02D 70/164* (2018.01); *Y02D 70/21* (2018.01)

(58) Field of Classification Search
USPC .......................................................... 370/311
See application file for complete search history.

(56) References Cited

U.S. PATENT DOCUMENTS

| | | | | |
|---|---|---|---|---|
| 2008/0268844 | A1* | 10/2008 | Ma ........................ | H04W 36/30 455/436 |
| 2009/0149184 | A1* | 6/2009 | Hohne .................. | H04W 36/38 455/437 |
| 2011/0080869 | A1* | 4/2011 | Walton .................. | H04L 45/306 370/328 |
| 2011/0305177 | A1* | 12/2011 | Woo ...................... | H04W 48/16 370/311 |
| 2012/0142328 | A1* | 6/2012 | Awoniyi ............... | H04W 36/22 455/418 |
| 2015/0072698 | A1* | 3/2015 | Wang .................... | H04W 76/14 455/450 |

OTHER PUBLICATIONS

Written Opinion issued in PCT/JP2014/081048; dated Feb. 17, 2015.
3rd Generation Partnership Project; Technical Specification Group Services and System Aspects; Feasibility study for Proximity Services (ProSe); 3GPP TR 22.803 V12.1.0; Mar. 2013; pp. 1-45; Release 12; 3GPP Organizational Partners.
Patil; Study on LTE Device to Device Proximity Services—Radio Aspects; 3GPP TSG-RAN Meeting #62; RP-131617; Dec. 3-6, 2013; pp. 1-11; Busan, Republic of Korea.

* cited by examiner

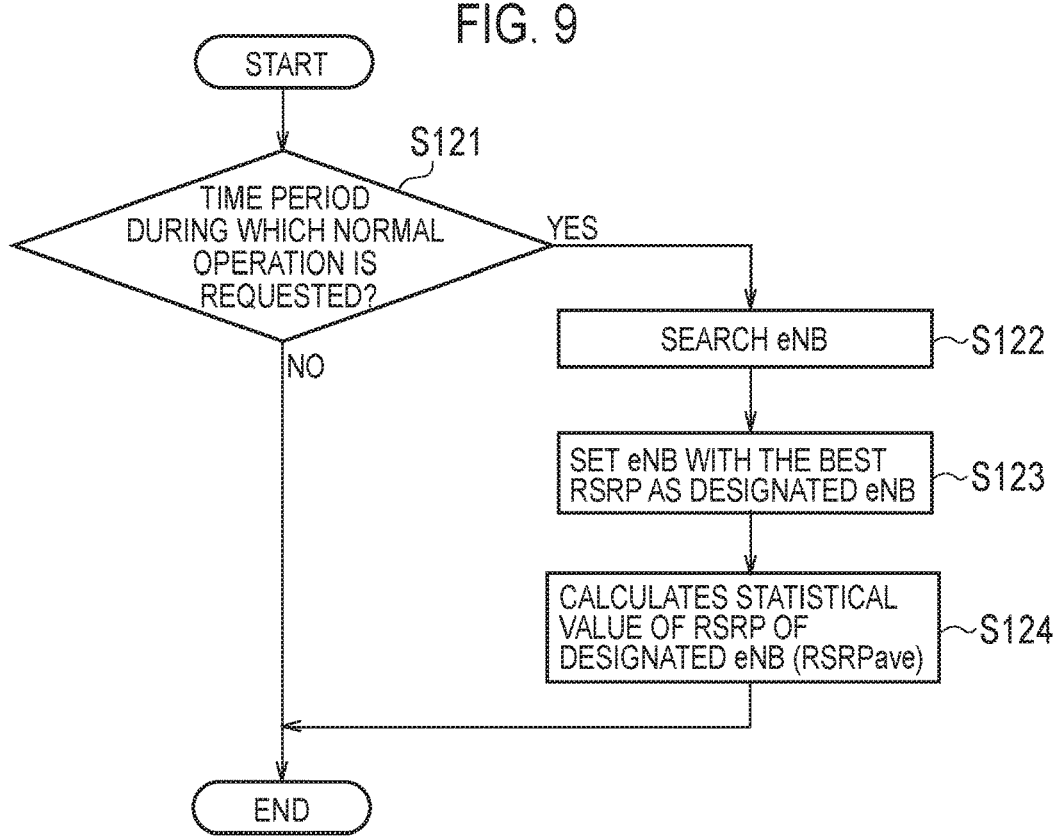
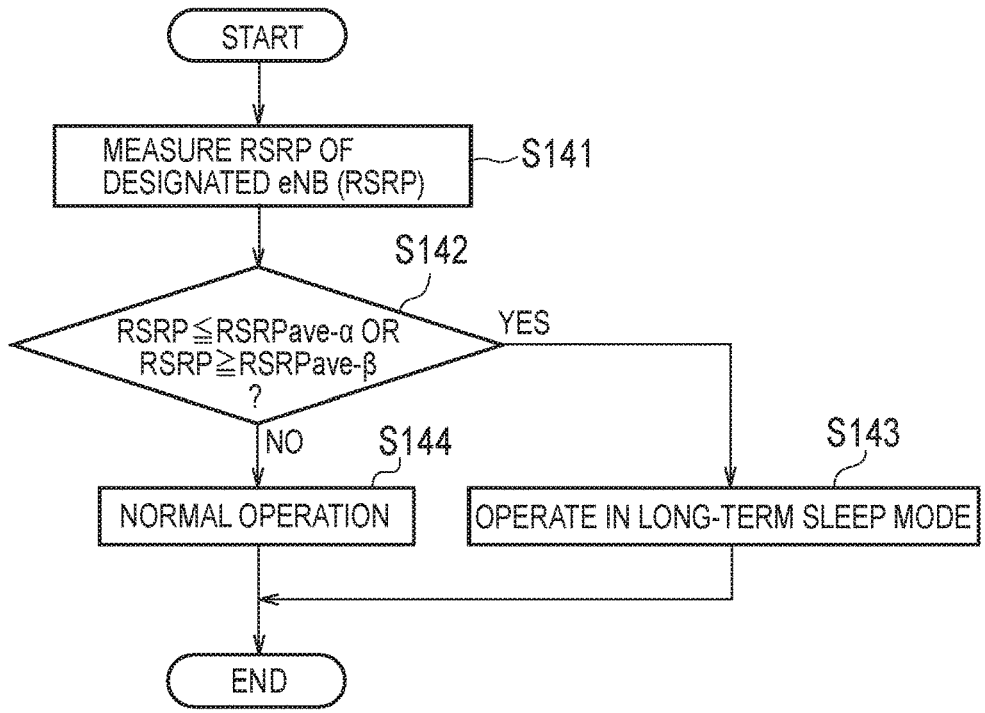

FIG. 12(A)

| TOTAL UE COUNT | FIXED D2DUE COUNT | IDLE UE COUNT | TRANSMISSION POWER |
|---|---|---|---|

FIG. 12(B)

| UE COUNT PER UNIT AREA | FIXED UE COUNT PER UNIT AREA | IDLE UE COUNT PER UNIT AREA |
|---|---|---|

FIG. 12(C)

| TOTAL UE COUNT | CONNECTED UE COUNT | IDLE UE COUNT | FIXED D2DUE COUNT | ESTIMATED SERVICE AREA | TRANSMISSION POWER |
|---|---|---|---|---|---|

FIG. 12(D)

| TOTAL UE COUNT | UE COUNT THAT DESIRES D2D CONNECTION | TRANSMISSION POWER |
|---|---|---|

COMMUNICATION CONTROL METHOD, USER TERMINAL, AND PROCESSOR

TECHNICAL FIELD

The present invention relates to a communication control method that supports D2D communication, a user terminal thereof, and a processor thereof.

BACKGROUND ART

In 3GPP (3rd Generation Partnership Project) which is a project aiming to standardize a mobile communication system, the introduction of Device to Device (D2D) proximity service (D2D ProSe) is discussed as a new function after Release 12 (see non patent document 1).

In D2D communication, which is an example of the D2D proximity service, a plurality of proximal user terminals perform direct device-to-device communication without passing through a network. On the other hand, in cellular communication, which is normal communication in a mobile communication system, a user terminal performs communication through a network.

Further, as an example of an operation in the D2D proximity service, the user terminal discovers another user terminal by a discovery signal (Discovery signal or Discoverable signal) used for discovery of a partner terminal (proximal terminal) in the D2D communication.

PRIOR ART DOCUMENT

Non-Patent Document

Non Patent Document 1: 3GPP technical report "TR 22.803 V12.1.0" March, 2013

SUMMARY OF THE INVENTION

Here, in addition to a general user terminal whose movement is not restricted, a fixed-type user terminal (hereinafter, called a fixed user terminal) whose movement is restricted is assumed as a user terminal that performs operation in the D2D proximity service. For example, by performing a discovery operation for discovering a partner terminal in the D2D communication, or for being discovered by a partner terminal, the fixed user terminal is capable of discovering a user terminal that has moved in the proximity of the fixed user terminal.

However, for example, there is a problem of unnecessary consumption of power since a partner terminal may not be discovered even after performing the discovery operation in cases when there is no partner in the proximity of the fixed user terminal, such as in the nighttime when the number of moving user terminals is less.

Therefore, an object of the present invention is to provide a communication control method, a user terminal, and a processor by which it is possible to restrain the unnecessary power consumption based on the operation in the D2D proximity service of a user terminal whose movement is restricted.

A communication control method according to an embodiment is used in a mobile communication system that supports a D2D proximity service. The communication control method comprises: an operation step of performing an operation for energy saving by a base station managing a cell in which a fixed-type user terminal, whose movement is restricted, exists; and a switching step of switching an operation mode from a normal mode to a power saving mode, by the user terminal, so that power consumption of an operation in the D2D proximity service is reduced, when the base station performs the operation for energy saving.

BRIEF DESCRIPTION OF THE DRAWINGS

FIG. 9 is a flowchart illustrating an operation for setting a designated eNB of the UE 100 in the mobile communication system according to the embodiment.
FIG. 10 is a flowchart illustrating an operation of the UE 100 in a modification of the operation 1 of the mobile communication system according to the embodiment.
FIGS. 12(A) to 12(D) are explanatory diagrams for describing an example of UE count information in the operation 2 of the mobile communication system according to the embodiment.

DESCRIPTION OF THE EMBODIMENT

Overview of Embodiment

Figure 1:
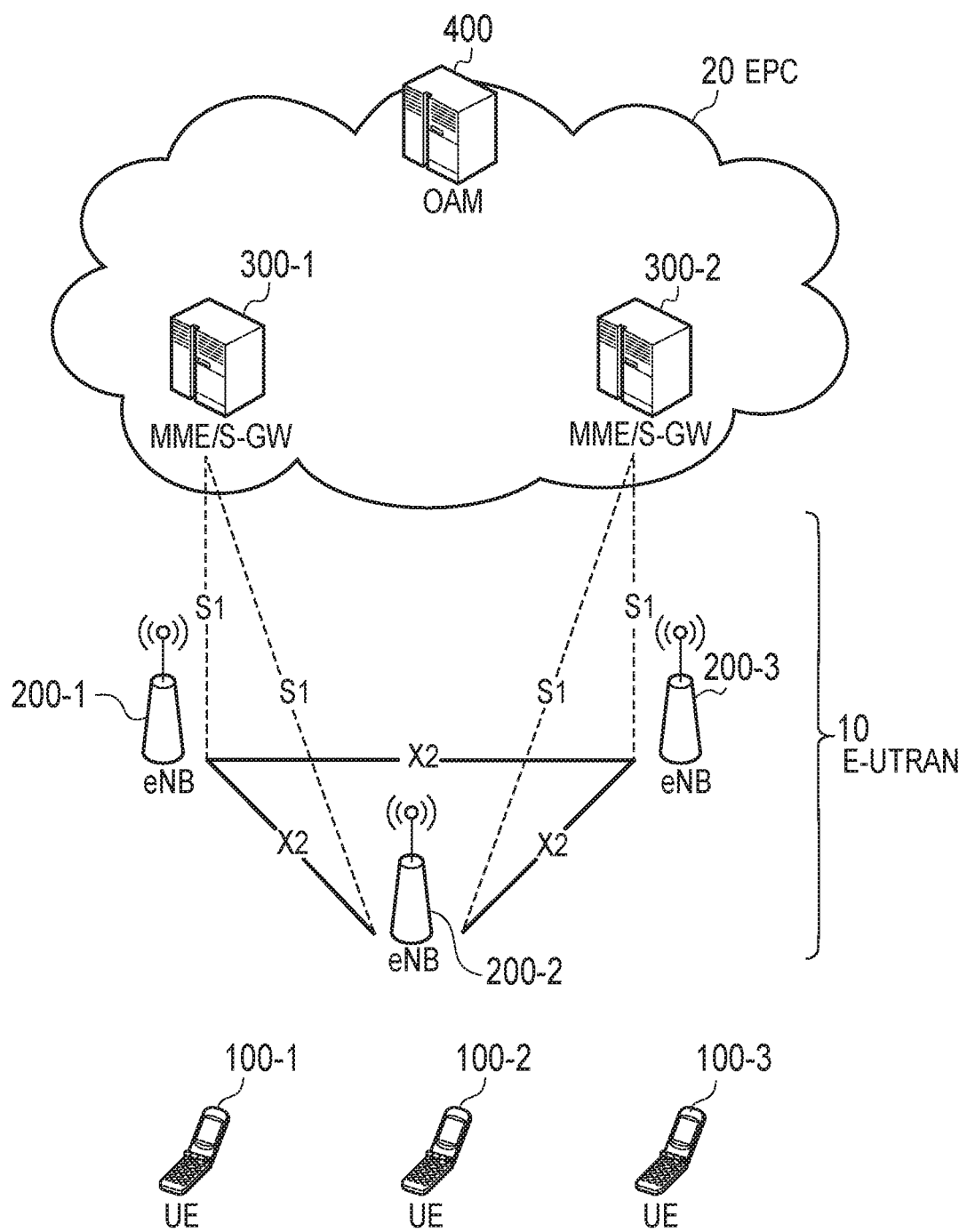
FIG. 1 is a configuration diagram of an LTE system.

A communication control method according to an embodiment is used in a mobile communication system that supports a D2D proximity service. The communication control method comprises: an operation step of performing an operation for energy saving by a base station managing a cell in which a fixed-type user terminal, whose movement is restricted, exists; and a switching step of switching an operation mode from a normal mode to a power saving mode, by the user terminal, so that power consumption of an operation in the D2D proximity service is reduced, when the base station performs the operation for energy saving.

In the embodiment, the operation in the D2D proximity service is at least one of a discovery operation for discovering a partner terminal in D2D communication or for being discovered by the partner terminal, and a transmission operation of a synchronization signal for establishing terminal-to-terminal synchronization.

In the embodiment, in the operation step, as the operation for energy saving, the base station reduces transmission power of a radio signal, and in the switching step, when received power of the radio signal becomes equal to or less than a threshold value, the user terminal switches the operation mode from the normal mode to the power saving mode.

The communication control method according to the embodiment comprises: a step of setting, prior to the operation step, by the user terminal, the base station transmitting the radio signal whose received power becomes maximum in a predetermined time period as a designated base station. In the switching step, when the base station set as the designated base station performs the operation for energy saving, the user terminal switches the operation mode from the normal mode to the power saving mode. The communication control method further comprises a step of maintaining, by the user terminal, the base station as the designated base station even when the received power of the radio signal from the base station is no longer the maximum received power.

In the embodiment, in the operation step, as the operation for energy saving, the base station reduces transmission power of a radio signal, and in the switching step, when received power of the radio signal from a neighboring base station becomes equal to or more than a threshold value as a result of the operation for energy saving, the user terminal switches the operation mode from the normal mode to the power saving mode.

The communication control method according to the embodiment comprises: a step of setting, prior to the operation step, by the user terminal, the neighboring base station transmitting the radio signal whose received power becomes maximum in a predetermined time period as a designated base station. In the switching step, when the received power of the radio signal from the neighboring base station set as the designated base station becomes equal to or more than a threshold value, the user terminal switches the operation mode from the normal mode to the power saving mode. The communication control method further comprises a step of maintaining, by the user terminal, the neighboring base station as the designated base station even when the received power of the radio signal from the neighboring base station is no longer the maximum received power.

In the embodiment, in the operation step, as the operation for energy saving, the base station transmits, to the user terminal, terminal count information on the number of user terminals located in the cell, and in the switching step, the user terminal switches the operation mode from the normal mode to the power saving mode on a basis of the terminal count information received from the base station.

In the embodiment, the terminal count information is information about at least any one of the total number of user terminals located in the cell, the number of user terminals per unit area, the number of user terminals per unit transmission power, the number of user terminals in a connected state, the number of user terminals in an idle state, the number of fixed-type user terminals, and the number of user terminals that desire to perform D2D communication.

The communication control method according to the embodiment comprises the steps of: broadcasting, by the base station, request information requesting information for obtaining the terminal count information; and obtaining, by the base station, the terminal count information on a basis of a response to the request information.

In the embodiment, the information for obtaining the terminal count information is at least any one of information indicating a connected state of a user terminal, information indicating whether or not a user terminal is a fixed-type user terminal, and information on desire to perform the D2D communication.

The communication control method according to the embodiment comprises the steps of: registering, by the user terminal, location information of the user terminal in an upper network device than the base station, when the user terminal moves inside the cell; acquiring, by the base station, from the network device, the location information registered in the network device; and obtaining, by the base station, the terminal count information on a basis of the acquired location information.

In the embodiment, in the operation step, as the operation for energy saving, the base station transmits, to the user terminal, a request for switching the operation mode from the normal mode to the power saving mode, and in the switching step, the user terminal switches the operation mode from the normal mode to the power saving mode on a basis of the request received from the base station.

In the embodiment, the operation in the D2D proximity service is at least one of a discovery operation for discovering a partner terminal in D2D communication or for being discovered by the partner terminal, and a transmission operation of a synchronization signal for establishing terminal-to-terminal synchronization. In the operation step, the base station transmits the request including restriction information of the discovery operation and/or of the transmission operation of the synchronization signal, the restriction information being applied when the operation mode is the power saving mode.

A user terminal according to an embodiment is a user terminal configured to be a fixed-type user terminal whose movement is restricted and to be used in a mobile communication system that supports a D2D proximity service. The user terminal comprises: a controller configured to switch an operation mode from a normal mode to a power saving mode so that power consumption of an operation in the D2D proximity service is reduced. The controller switches the operation mode from the normal mode to the power saving mode when a base station managing a cell in which the user terminal exists performs an operation for energy saving.

In the embodiment, the operation in the D2D proximity service is at least one of a discovery operation for discovering a partner terminal in D2D communication or for being discovered by the partner terminal, and a transmission operation of a synchronization signal for establishing terminal-to-terminal synchronization.

In the embodiment, when received power of a radio signal from the base station becomes equal to or less than a threshold value, the controller switches the operation mode from the normal mode to the power saving mode.

In the embodiment, the controller sets the base station transmitting the radio signal whose received power becomes maximum in a predetermined time period as a designated base station, the controller switches the operation mode from the normal mode to the power saving mode, when the base station set as the designated base station performs the operation for energy saving, and the controller maintains the base station as the designated base station even when the received power of the radio signal from the base station is no longer the maximum received power.

In the embodiment, when received power of a radio signal from an neighboring base station becomes equal to or more than a threshold value as a result of the operation for energy saving, the controller switches the operation mode from the normal mode to the power saving mode.

In the embodiment, the controller sets the neighboring base station transmitting the radio signal whose received power becomes maximum in a predetermined time period as a designated base station, the controller switches the operation mode from the normal mode to the power saving mode, when the received power of the radio signal from the neighboring base station set as the designated base station becomes equal to or more than a threshold value, and the controller maintains the neighboring base station as the designated base station even when the received power of the radio signal from the neighboring base station is no longer the maximum received power.

The user terminal according to the embodiment further comprises: a receiver configured to receive, from the base station, terminal count information on the number of user terminals located in the cell. The controller switches the operation mode from the normal mode to the power saving mode on a basis of the terminal count information received from the base station.

The user terminal according to the embodiment further comprises: a receiver configured to receive, from the base station, a request for switching, by the user terminal, the operation mode from the normal mode to the power saving mode. The controller switches the operation mode from the normal mode to the power saving mode on a basis of the request received from the base station.

A processor is a processor configured to be provided in a fixed-type user terminal whose movement is restricted and is used in a mobile communication system that supports a D2D proximity service. The processor executes: processing of switching an operation mode from a normal mode to a power saving mode so that power consumption of an operation in the D2D proximity service is reduced; and processing of switching the operation mode from the normal mode to the power saving mode when a base station managing a cell in which the user terminal exists performs an operation for energy saving.

Embodiment (LTE System)

FIG. 1 is a configuration diagram of an LTE system according to the present embodiment.

As illustrated in FIG. 1, the LTE system includes a plurality of UEs (User Equipments) 100, E-UTRAN (Evolved Universal Terrestrial Radio Access Network) 10, and EPC (Evolved Packet Core) 20. The E-UTRAN 10 and the EPC 20 constitute a network.

The UE 100 is a mobile radio communication apparatus and performs radio communication with a cell (a serving cell) with which a connection is established. The UE 100 corresponds to the user terminal.

The E-UTRAN 10 includes a plurality of eNBs 200 (evolved Node-Bs). The eNB 200 corresponds to a base station. The eNB 200 controls a cell and performs radio communication with the UE 100 that establishes a connection with the cell.

It is noted that the "cell" is used as a term indicating a minimum unit of a radio communication area, and is also used as a term indicating a function of performing radio communication with the UE 100.

The eNB 200, for example, has a radio resource management (RRM) function, a routing function of user data, and a measurement control function for mobility control and scheduling.

The EPC 20 includes MMEs (Mobility Management Entities)/S-GWs (Serving-Gateways) 300, and OAM 400 (Operation and Maintenance). Further, the EPC 20 corresponds to a core network.

The MME is a network node for performing various mobility controls, etc., for the UE 100 and corresponds to a controller. The S-GW is a network node that performs transfer control of user data and corresponds to a mobile switching center.

The OAM 400 is a server device managed by an operator and performs maintenance and monitoring of the E-UTRAN 10.

Next, the configurations of the UE 100 and the eNB 200 will be described.

Figure 2:
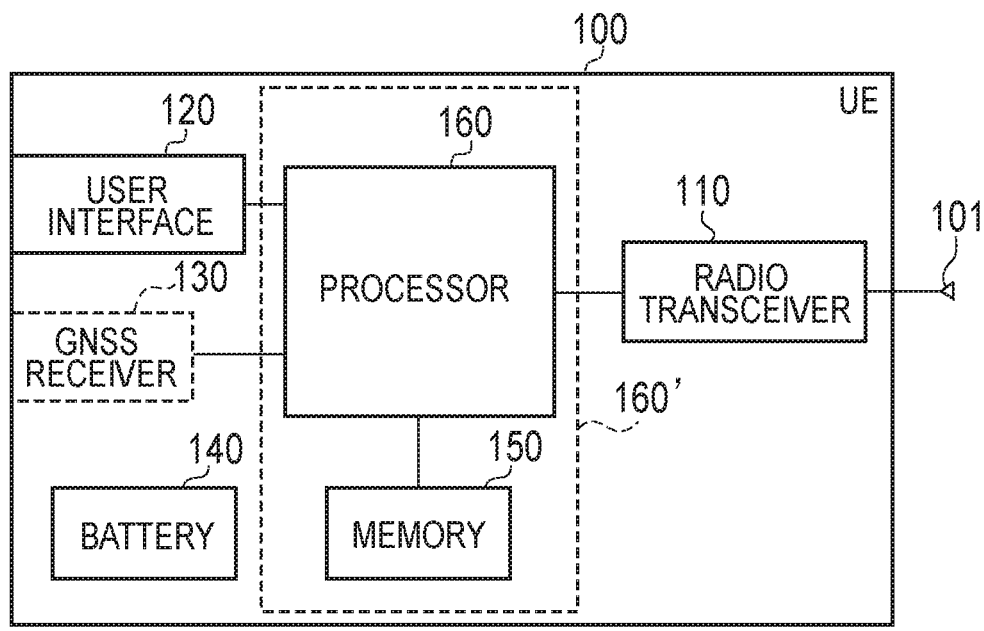
FIG. 2 is a block diagram of a UE.

FIG. 2 is a block diagram of the UE 100. As illustrated in FIG. 2, the UE 100 includes an antenna 101, a radio transceiver 110, a user interface 120, a GNSS (Global Navigation Satellite System) receiver 130, a battery 140, a memory 150, and a processor 160. The memory 150 and the processor 160 constitute a controller.

The UE 100 may not have the GNSS receiver 130. It is noted that the memory 150 may be integrally formed with the processor 160, and this set (that is, a chipset) may be called a processor 160'.

The antenna 101 and the radio transceiver 110 are used to transmit and receive a radio signal. The antenna 101 includes a plurality of antenna elements. The radio transceiver 110 converts a baseband signal output from the processor 160 into the radio signal, and transmits the radio signal from the antenna 101. Furthermore, the radio transceiver 110 converts the radio signal received by the antenna 101 into the baseband signal, and outputs the baseband signal to the processor 160.

The user interface 120 is an interface with a user carrying the UE 100, and includes, for example, a display, a microphone, a speaker, and various buttons. The user interface 120 receives an operation from a user and outputs a signal indicating the content of the operation to the processor 160.

The GNSS receiver 130 receives a GNSS signal in order to obtain location information indicating a geographical location of the UE 100, and outputs the received signal to the processor 160.

The battery 140 accumulates a power to be supplied to each block of the UE 100.

The memory 150 stores a program to be executed by the processor 160 and information to be used for a process by the processor 160.

The processor 160 includes a baseband processor that performs modulation and demodulation, encoding and decoding and the like of the baseband signal, and a CPU (Central Processing Unit) that performs various processes by executing the program stored in the memory 150. The processor 160 may further include a codec that performs encoding and decoding of sound and video signals. The processor 160 implements various processes and various communication protocols described later.

Figure 3:
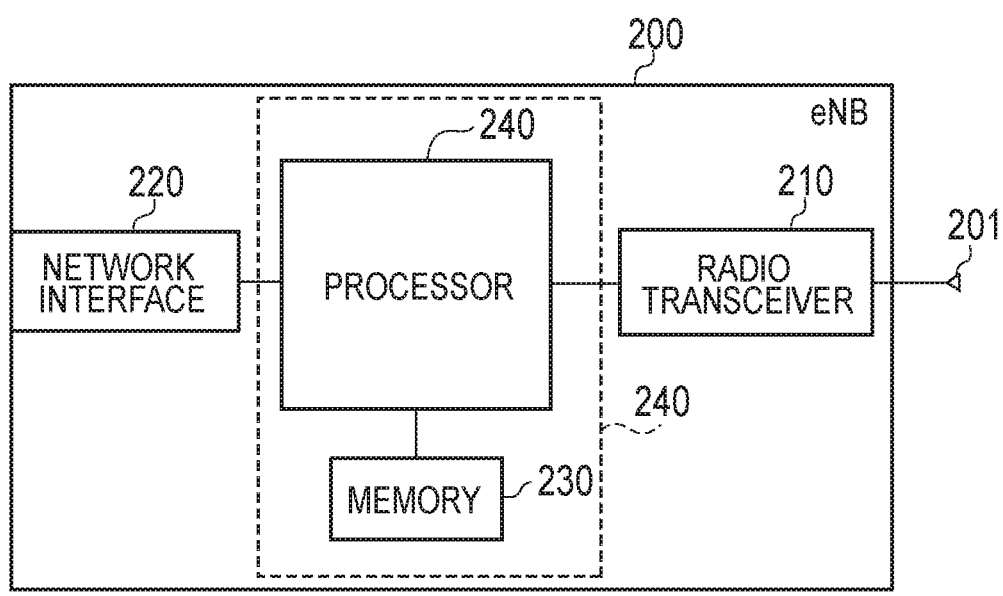
FIG. 3 is a block diagram of an eNB.

FIG. 3 is a block diagram of the eNB 200. As illustrated in FIG. 3, the eNB 200 (including a MeNB 200A, a PeNB 200B, and a PeNB 200B as described later) includes an antenna 201, a radio transceiver 210, a network interface 220, a memory 230, and a processor 240. The memory 230 and the processor 240 constitute a controller. It is noted that the memory 230 may be integrally formed with the processor 240, and this set (that is, a chipset) may be called a processor 240'.

The antenna 201 and the radio transceiver 210 are used to transmit and receive a radio signal. The antenna 201 includes a plurality of antenna elements. The radio transceiver 210 converts the baseband signal output from the processor 240 into the radio signal, and transmits the radio signal from the antenna 201. Furthermore, the radio transceiver 210 converts the radio signal received by the antenna 201 into the baseband signal, and outputs the baseband signal to the processor 240.

The network interface 220 is connected to the neighbor eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240.

The processor 240 includes the baseband processor that performs modulation and demodulation, and encoding and decoding of the baseband signal and a CPU that performs various processes by executing the program stored in the memory 230. The processor 240 implements various processes and various communication protocols described later.

Figure 4:
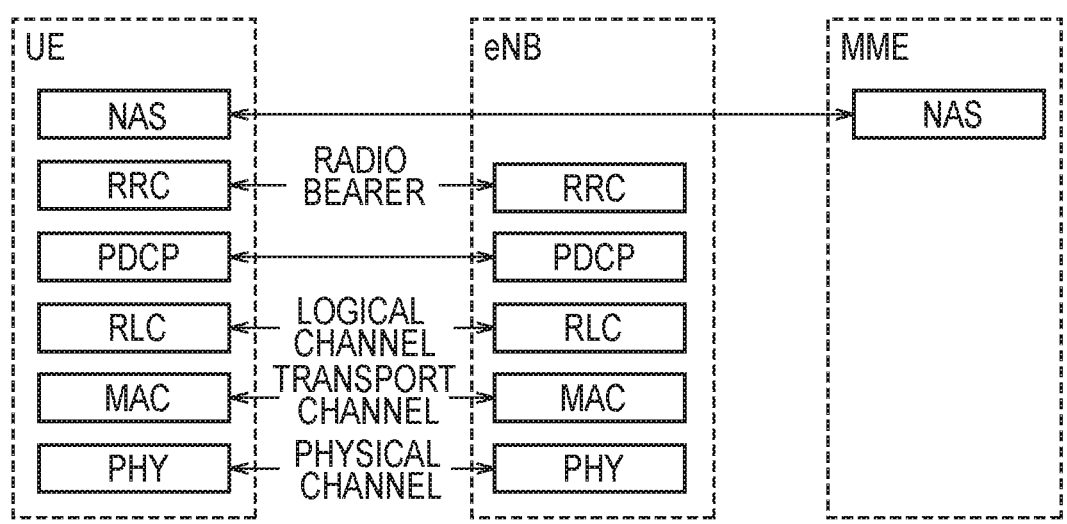
FIG. 4 is a protocol stack diagram of a radio interface in the LTE system.

FIG. 4 is a protocol stack diagram of a radio interface in the LTE system.

As illustrated in FIG. 4, the radio interface protocol is classified into a layer 1 to a layer 3 of an OSI reference model, wherein the layer 1 is a physical (PHY) layer. The layer 2 includes a MAC (Medium Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. The PHY layer provides a transmission service to an upper layer by use of a physical channel. Between the PHY layer of the UE 100 and the PHY layer of the eNB 200, data is transmitted via the physical channel.

The MAC layer performs preferential control of data, and a retransmission process and the like by hybrid ARQ (an HARQ). Between the MAC layer of the UE 100 and the MAC layer of the eNB 200, data is transmitted via a transport channel. The MAC layer of the eNB 200 includes a MAC scheduler that determines an uplink and downlink transport format (a transport block size, a modulation and coding scheme and the like) and an assignment resource block.

The RLC layer transmits data to an RLC layer of a reception side by using the functions of the MAC layer and the PHY layer. Between the RLC layer of the UE 100 and the RLC layer of the eNB 200, data is transmitted via a logical channel.

The PDCP layer performs header compression and decompression, and encryption and decryption.

The RRC layer is defined only in a control plane. Between the RRC layer of the UE 100 and the RRC layer of the eNB 200, a control signal (an RRC message) for various types of setting is transmitted. The RRC layer controls the logical channel, the transport channel, and the physical channel in response to establishment, re-establishment, and release of a radio bearer. When an RRC connection is established between the RRC of the UE 100 and the RRC of the eNB 200, the UE 100 is in a connection state, and when the RRC connection is not established, the UE 100 is in an idle state.

A NAS (Non-Access Stratum) layer positioned above the RRC layer performs session management or mobility management, for example.

(D2D Communication)

Next, a description is given with comparing the D2D communication with the normal communication (the cellular communication) in the LTE system.

Figure 5:
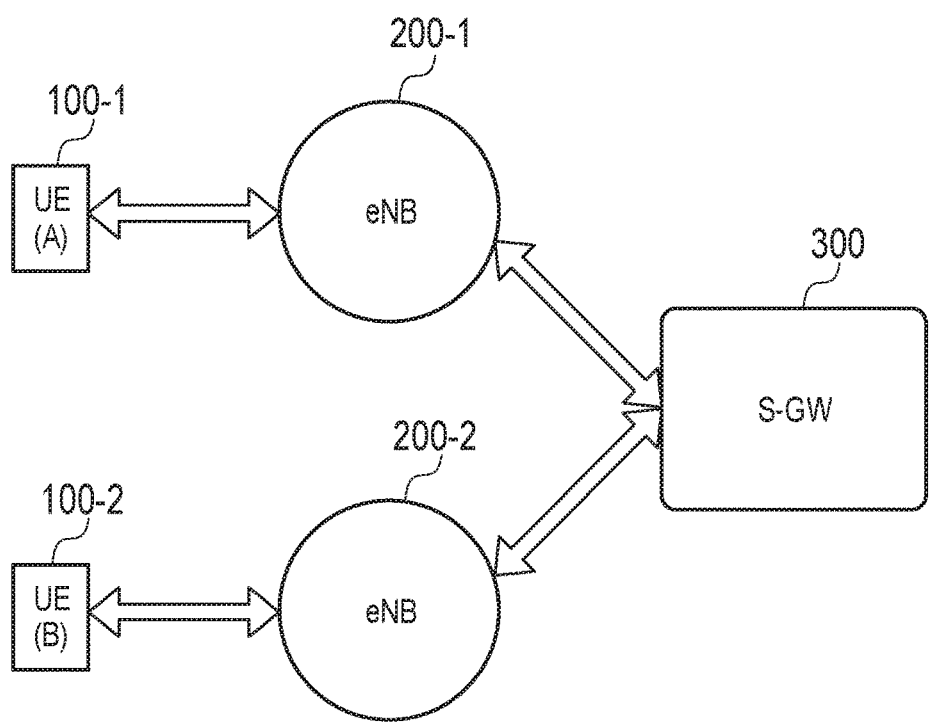
FIG. 5 is a diagram illustrating a data path in cellular communication.

FIG. 5 is a diagram illustrating a data path in the cellular communication. In this case, FIG. 5 illustrates the case in which the cellular communication is performed between UE 100-1 that establishes a connection with eNB 200-1 and UE 100-2 that establishes a connection with eNB 200-2. It is noted that the data path indicates a transfer path of user data (a user plane).

As illustrated in FIG. 5, the data path of the cellular communication goes through a network. Specifically, the data path is set to pass through the eNB 200-1, the S-GW 300, and the eNB 200-2.

Figure 6:
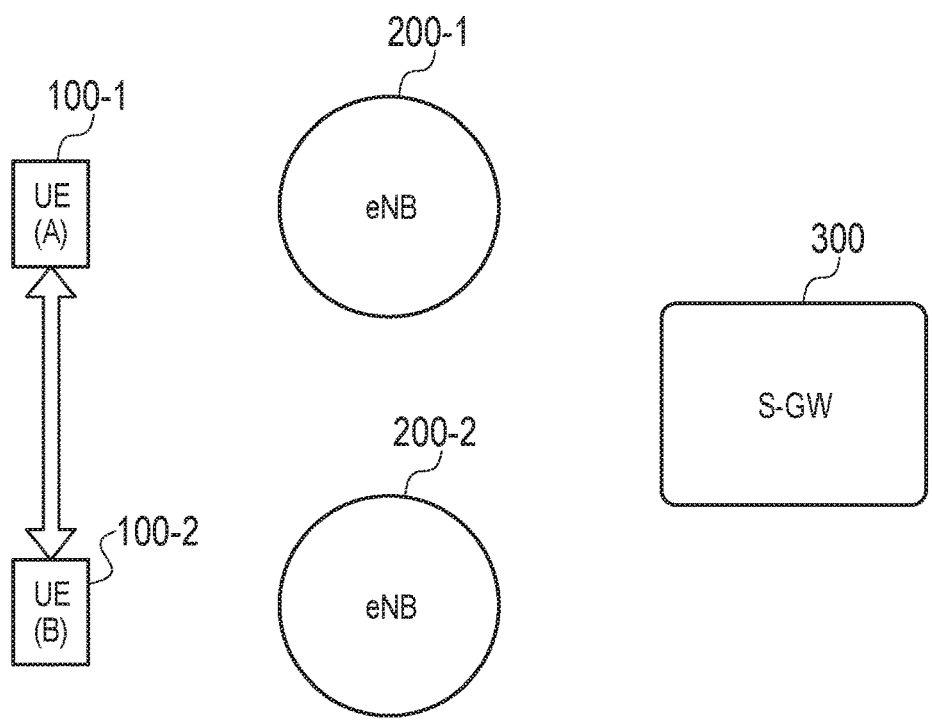
FIG. 6 is a diagram illustrating a data path in D2D communication.

FIG. 6 is a diagram illustrating a data path in the D2D communication. In this case, FIG. 6 illustrates the case in which the D2D communication is performed between the UE 100-1 that establishes a connection with the eNB 200-1 and the UE 100-2 that establishes a connection with the eNB 200-2.

As illustrated in FIG. 6, the data path of the D2D communication does not go through a network. That is, direct radio communication is performed between the UEs. As described above, when the UE 100-2 exists in the vicinity of the UE 100-1, the D2D communication is performed between the UE 100-1 and the UE 100-2, thereby obtaining an effect that a traffic load of the network and a battery consumption amount of the UE 100 are reduced, for example.

It is noted that cases in which the D2D communication is started include (a) a case in which the D2D communication is started after a partner terminal is discovered by performing an operation for discovering a partner terminal, and (b) a case in which the D2D communication is started without performing an operation for discovering a partner terminal.

For example, in the above-described case (a), one UE 100 of the UE 100-1 and the UE 100-2 discovers the other UE 100 existing in the proximity of the one UE 100, so that the D2D communication is started.

In such a case, in order to discover the proximal terminal, the UE 100 has a (Discover) function of discovering another UE 100 existing in the proximity of the UE 100, and/or a (Discoverable) function of being discovered by another UE 100.

It is noted that the UE 100 need not necessarily perform the D2D communication even upon discovering a partner terminal. For example, after mutually discovering each other, the UE 100-1 and the UE 100-2 may perform a negotiation, and determine whether or not to perform the D2D communication. When each of the UE 100-1 and the UE 100-2 agrees to perform the D2D communication, the D2D communication starts. Further, the UE 100-1 may report a vicinity UE 100 (that is, the UE 100-2) to an upper layer (such as an application) in a case where the UE 100-1 does not perform the D2D communication after discovering the partner terminal. For example, the application can perfume a process based on the report (such as a process in which a location of the UE 100-2 is plotted on map information).

Further, the UE 100 can report discovering the partner terminal to the eNB 200 and receive instruction for whether communication with the partner terminal is performed by the cellular communication or the D2D communication, from the eNB 200.

On the other hand, in the above-described case (b), for example, the UE 100-1 starts transmitting (announcing by broadcast or the like) a signal for the D2D communication without specifying the partner terminal. Thus, the UE 100 is capable of starting the D2D communication regardless of the existence of the discovery of a partner terminal. It is noted the UE 100-2 performing a waiting operation for receiving a signal for the D2D communication performs synchronization and/or demodulation on the basis of the signal from the UE 100-1.

Operation According to Embodiment

Next, operations 1 through 3 of the mobile communication system according to the present embodiment will be described.

(1) Operation 1

(1.1) Overview of Operation 1

An operation overview of an operation 1 of the mobile communication system according to the present embodiment will be described by using FIGS. 7 (A), 7(B) and FIG. 8. FIGS. 7(A) and 7(B) are explanatory diagrams for describing the operation overview of the operation 1 of the mobile communication system according to the embodiment. FIG. 8 is a flowchart illustrating an operation of the UE 100 in the operation 1 of the mobile communication system according to the embodiment.

In the operation 1, as an operation for energy saving, the eNBs 200 (eNB 200-1 and eNB 200-2) reduces the transmission power of a radio signal. In the present embodiment, the eNB 200 sets a cell of the eNB 200 to OFF (that is, the eNB 200 sets the transmission power of the radio signal for forming the cell of the eNB 200 to 0.)

For example, the eNB 200 determines whether or not to set a cell of the eNB 200 to OFF on the basis of time fluctuation of the traffic condition (the number of UEs to be connected, the amount of data to be exchanged, or the usage ratio of a radio resource) in the eNB 200. For example, the eNB 200 determines to set a cell of the eNB 200 to OFF in a time zone when the amount of data to be exchanged etc. is less.

Figure 7A:
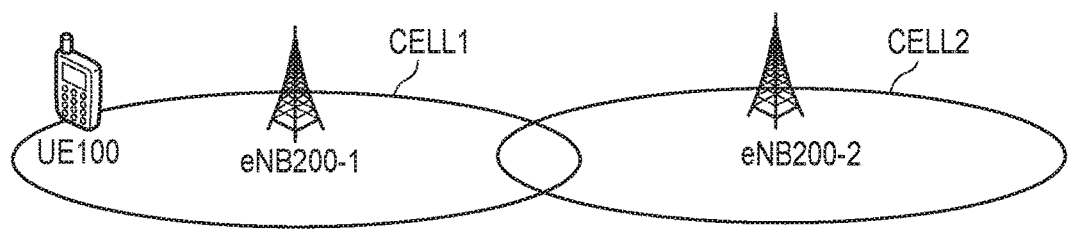
FIGS. 7(A) and 7(B) are explanatory diagrams for describing an operation overview of an operation 1 of a mobile communication system according to an embodiment.
Figure 7B:
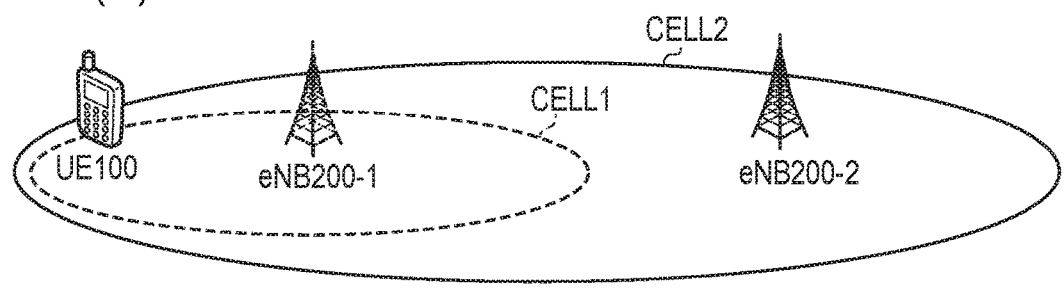
Figure 8:
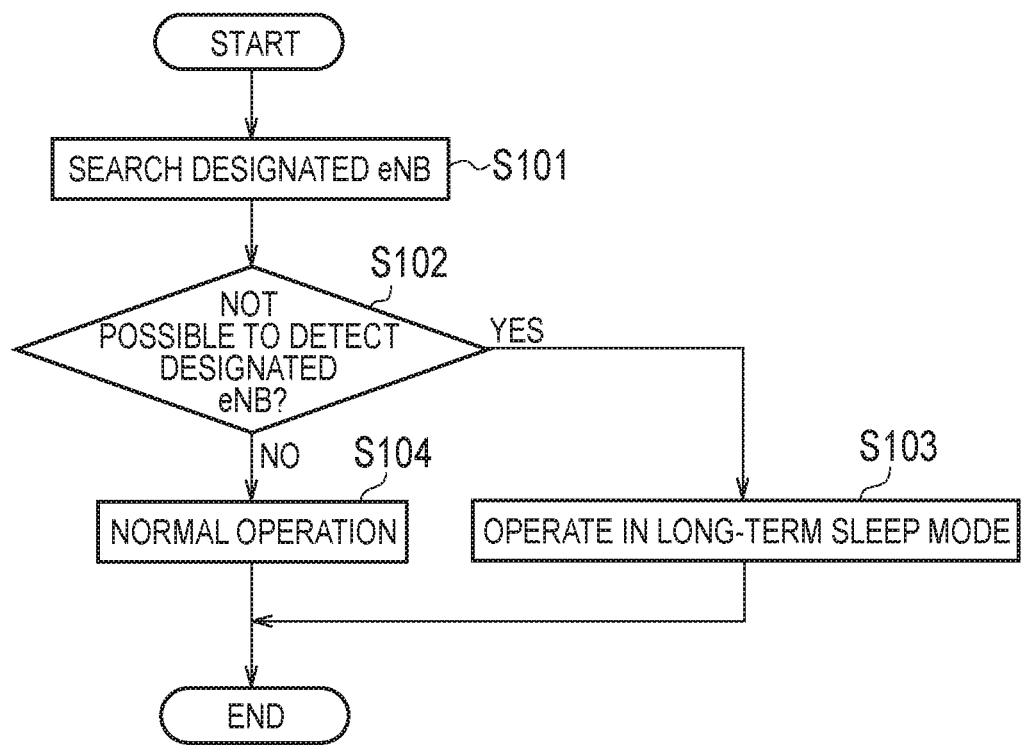
FIG. 8 is a flowchart illustrating an operation of a UE 100 in the operation 1 of the mobile communication system according to the embodiment.

As illustrated in FIGS. 7(A) and 7(B), the mobile communication system has the UE 100, the eNB 200-1, and the eNB 200-2.

The eNB 200-1 manages a cell 1 in which the UE 100 exists (see FIG. 7 (A)). The eNB 200-1 corresponds to an OFF target base station in which the cell 1, which is a cell of the eNB 200-1, is to be set to OFF. On the other hand, the eNB 200-2 corresponds to a neighboring eNB of the eNB 200-1. The eNB 200-2 corresponds to an extension target base station in which cell extension is to be performed for compensating the cell 1 of the eNB 200-1.

The UE 100 is a fixed-type UE whose movement is restricted. As an example, the fixed-type UE is a UE 100 whose location is fixed. Alternatively, the fixed UE 100 is a UE 100 which has an MTC function.

Further, in order to distribute predetermined information (for example, an advertisement), the UE 100 performs the discovery operation for discovering a partner UE in the D2D communication, or for being discovered by a partner UE. Specifically, the UE 100 transmits a discovery signal (Discovery signal/Discoverable signal). The UE 100 and the partner UE discover the respective partners through the discovery signal (or a response to the discovery signal). The UE 100 is capable of transmitting predetermined information to the discovered partner UE through the D2D communication. Further, the UE 100 is capable of receiving information from the partner terminal.

Moreover, the eNB 200-1 is set beforehand in the UE 100 as the designated eNB. When the received power of the radio signal from the eNB 200-1, which is the designated eNB, becomes less than a threshold value (for example, when it is not possible to receive a radio signal from the eNB 200-1), the UE 100 switches the operation mode from the normal mode to the power saving mode. On the other hand, when the received power of the radio signal from the eNB 200-1 becomes equal to or more than a threshold value (for example, when it is possible to detect a radio signal from the eNB 200-1), the UE 100 switches the operation mode from the power saving mode to the normal mode.

Here, the normal mode is the mode in which normal operation is performed. On the other hand, the power saving mode is the mode in which the power consumption of at least the discovery operation is less than the power consumption of the discovery operation in the normal mode. For example, when the operation mode is set to the power saving mode, the UE 100 drops the frequency of the discovery operation (lengthens the transmission cycle of the discovery signal), or reduces the amount of transmission information in the discovery operation. Further, the power saving mode may be a long-term sleep mode in which the UE 100 stops the discovery operation until the eNB 200-1 terminates the operation for energy saving. It is noted that the UE 100 may stop operations other than the discovery operation (for example, D2D communication).

Next, an operation of the UE 100 in the operation 1 will be described.

As illustrated in FIG. 8, in step S101, the UE 100 searches the eNB 200-1 (designated eNB).

In step S102, the UE 100 determines whether or not it is possible to detect the eNB 200-1. Specifically, the UE 100 determines whether or not a radio signal from the eNB 200-1 is received. When the UE 100 is not capable of detecting the eNB 200-1 (in the case of "YES"), the UE 100 determines that the eNB 200-1 has set the cell 1 to OFF (that is, the eNB 200-1 has performed the operation for energy saving), and executes the processing of step S103. On the other hand, when the UE 100 is capable of detecting the eNB 200-1 (in the case of "NO"), the UE 100 executes the processing of step S104.

In step S103, the UE 100 switches the operation mode from the normal mode to a long-term sleep mode, which is a power saving mode. Thereafter, the UE 100 stops the discovery operation.

On the other hand, in step S104, the UE 100 maintains the normal mode, and performs the normal discovery operation.

(1.2) Modification of Operation 1

Next, a modification of the operation 1 will be described by using FIG. 9 and FIG. 10. It is noted that a description will be provided while focusing on a portion different from the above-described operation 1, and a description of a similar portion will be omitted, where necessary.

FIG. 9 is a flowchart illustrating an operation for setting a designated eNB of the UE 100 in the mobile communication system according to the embodiment. FIG. 10 is a flowchart illustrating an operation of the UE 100 in a modification of the operation 1 of the mobile communication system according to the embodiment.

In the above-described operation 1, the eNB 200-1 is set beforehand in the UE 100 as the designated eNB. In the present modification, the UE 100 autonomously sets the designated eNB.

First of all, an example of a method in which the UE 100 sets the designated eNB will be described.

As illustrated in FIG. 9, in step S121, the UE 100 determines whether or not a current time period is a time period during which the normal operation has been requested. When the current time period is a time period during which the normal operation has been requested, the UE 100 executes the processing of step S122, and when the current time period is not a time period during which the normal operation has been requested, the UE 100 terminates the processing.

It is noted that regardless of whether the current time period is a time period during which the normal operation has been requested, the UE 100 may execute the processing of step S122 at a predetermined time (or time period) designated from the network.

In step S122, the UE 100 receives a radio signal of a surrounding eNB 200, and searches the eNB.

In step S123, among the eNBs 200 whose radio signals are received by the UE 100, the UE 100 sets the eNB 200 with the best (maximum) RSRP indicating the received power as the designated eNB.

In step S124, the UE 100 calculates the statistical value of the RSRP of the designated eNB. The UE 100, for example, calculates the average value (RSRPave) of the RSRP of the designated eNB.

Thereafter, even if the RSRP of the designated eNB is no longer the maximum, the UE 100 maintains the designated eNB from the time when the current time period becomes a time period during which the normal operation has been requested until the setting of the designated eNB is requested.

Next, an example of a method in which the UE 100 switches the operation mode will be described.

In step S141, the UE 100 measures the RSRP of the designated eNB.

In step S142, the UE 100 determines whether or not the measured RSRP is equal to or less than a first threshold value, or is equal to or more than a second threshold value. Specifically, the UE 100 determines whether or not the measured RSRP satisfies the below-mentioned Equation (1) or Equation (2).

$$RSRP \geq RSRPave - \alpha \quad \text{Equation (1)}$$

$$RSRP \leq RSRPave + \beta \quad \text{Equation (2)}$$

Here, the first threshold value is a value (RSRPave−α) calculated by the average value (RSRPave) and a coefficient (α). The second threshold value is a value (RSRPave+β) calculated by the average value (RSRPave) and a coefficient (β).

It is noted that the coefficient may be a fixed value determined beforehand, or may be decided on the basis of the distribution during the calculation of the statistical value in step S124.

When the measured RSRP satisfies Equation (1), the UE 100 determines that the eNB 200-1 has set the cell 1 to OFF to perform the operation for energy saving. On the other hand, when the measured RSRP satisfies Equation (2), the UE 100 determines that as a result of setting the cell 1 of the eNB 200-1 to OFF, the eNB 200-2 has extended a cell 2. That is, the UE 100 determines that the eNB 200-1 performs the operation for energy saving.

When the UE 100 determines that the measured RSRP satisfies the below-mentioned Equation (1) or Equation (2), the UE 100 executes the processing of step S143. On the other hand, when the UE 100 determines that the measured RSRP does not satisfy the below-mentioned Equation (1) and Equation (2), the UE 100 executes the processing of step S144.

Steps S143 and S144 correspond to steps S103 and S104.

(2) Operation 2

Next, an operation 2 will be described. A description will be provided while focusing on a portion different from the above-described operation 1, and a description of a similar portion will be omitted, where necessary.

In the operation 1, the eNB 200 reduces the transmission power of the radio signal as an operation for energy saving. On the other hand, in the operation 2, as an operation for energy saving, the eNB 200 transmits, to the UE 100, UE count information on the number of UEs 100 located in a cell of the eNB 200.

(2.1) Operation of UE 100 in Operation 2

Figure 11:
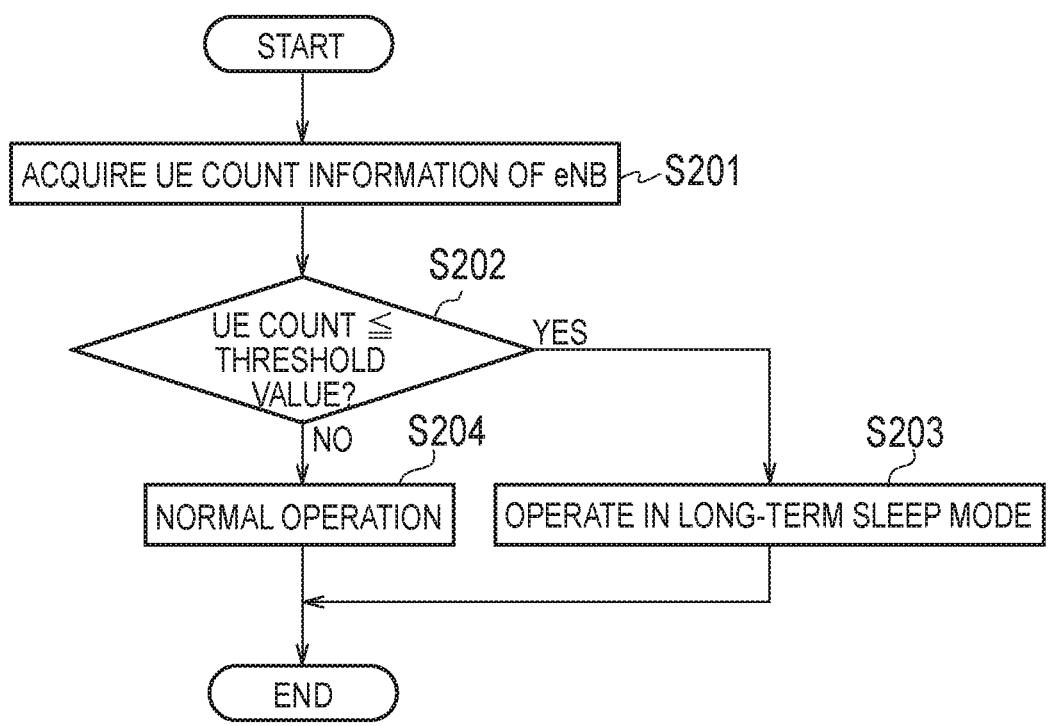
FIG. 11 is a flowchart illustrating an operation of the UE 100 in an operation 2 of the mobile communication system according to the embodiment.

An operation of the UE 100 in the operation 2 will be described by using FIG. 11 and FIGS. 12(A) to 12(B). FIG. 11 is a flowchart illustrating an operation of the UE 100 in the operation 2 of the mobile communication system according to the embodiment. FIGS. 12(A) to 12(D) are explanatory diagrams for describing an example of UE count information in the operation 2 of the mobile communication system according to the embodiment.

The UE 100 exists in a cell managed by the eNB 200.

As illustrated in FIG. 11, in step S201, the UE 100 acquires UE count information from the eNB 200. The eNB 200 transmits the UE count information by broadcast or by unicast. The UE 100 may also acquire the UE count information by requesting the UE count information to the eNB 200.

The UE count information is information on the number of UEs located in a cell. For example, the UE count information is information cited in FIGS. 12(A) to 12(D).

In FIG. 12(A), the UE count information includes information indicating the total number of UEs located in a cell (total UE count information), information indicating the number of fixed-type UEs that perform D2D communication (fixed D2DUE count), information indicating the number of UEs in the idle state (idle UE count), and information indicating the transmission power of the eNB 200 (transmission power). It is noted that the transmission power of the eNB 200 is used for estimating the number of UEs per unit area.

In FIG. 12(B), the UE count information includes information indicating the number of UEs per unit area (UE count per unit area), information indicating the number of fixed-type UEs per unit area (fixed UE count per unit area), and information indicating the number of UEs in the idle state per unit area (idle UE count per unit area).

In FIG. 12(C), the UE count information includes the "Total UE count", information indicating the number of UEs in the connected state (RRC connection state) (connected UE count), "Idle UE count", "Fixed D2DUE count", area indicating the estimated size of a cell of the eNB 200 (estimated service area), and "Transmission power".

In FIG. 12(D), the UE count information includes the "Total UE count", information indicating the number of UEs that desire to perform D2D communication, and "Transmission power".

In step S202, the UE 100 determines whether or not the number of UEs is equal to or less than a threshold value on the basis of the UE count information.

Here, the number of UEs to be compared with the threshold value may be any information included in the above-described UE count information. Alternatively, the UE 100 may calculate the number of UEs for comparison with the threshold value (for example, the number of UEs per unit area, etc.) by a predetermined equation as a single instance (or a plurality of instances) of information included in the UE count information.

When the number of UEs is equal to or less than a threshold value (in the case of "YES"), the UE 100 executes the processing of step S203, and when the number of UEs is more than the threshold value (in the case of "NO"), the UE 100 executes the processing of step S204.

Steps S203 and S204 correspond to steps S103 and S104.

It is noted that when the number of UEs is equal to or less than the threshold value, the UE 100 determines that the number of UEs in a cell (the density) falls equal to or less than the estimated number, and the number of UEs capable of performing D2D communication is small, and thus switches the operation mode to the power saving mode (alternatively, the UE 100 maintains the power saving mode). On the other hand, when the number of UEs is more than the threshold value, the UE 100 determines that the number of UEs in a cell (the density) does not fall equal to or less than the estimated number, and the number of UEs capable of performing D2D communication is large, and thus switches the operation mode to the normal mode (alternatively, the UE 100 maintains the normal mode).

(2.2) Method of Determining UE Count Information

Next, a first method and a second method for determination of the UE count information by the eNB 200 will be described by using FIG. 13 through FIG. 15.

Figure 13:
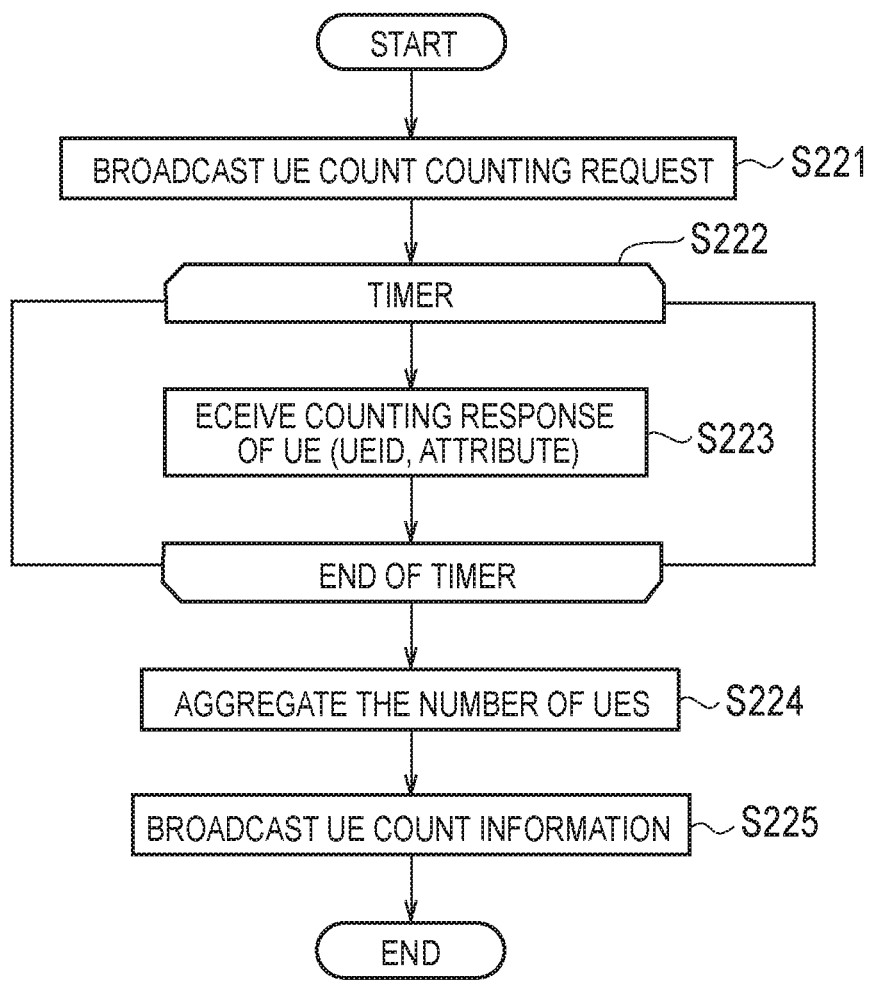
FIG. 13 is a flowchart illustrating an operation of an eNB 200 in the operation 2 of the mobile communication system according to the embodiment.

FIG. 13 is a flowchart illustrating an operation of the eNB 200 in the operation 2 of the mobile communication system according to the embodiment. FIG. 14 is an explanatory diagram for describing a method for determination of UE count information by the eNB 200 in the operation 2 of the mobile communication system according to the embodiment. FIG. 15 is a flowchart illustrating a location registration operation of the UE 100 in the operation 2 of the mobile communication system according to the embodiment.

The first method is a method of acquisition of information, by the eNB 200, for obtaining terminal count information from the UE 100 that exists in a cell.

As illustrated in FIG. 13, in step S221, the eNB 200 broadcasts a UE count counting request. The UE 100 located in the cell receives the UE count counting request.

The UE count counting request is information requesting information for obtaining the terminal count information. The information for obtaining the terminal count information, for example, includes information indicating identifiers of the UE and attributes of the UE. The information indicating the attributes of the UE may be at least any one of information indicating the connected state of the UE 100 (the idle state/RRC connection state), information indicating whether or not the UE 100 is a fixed-type UE 100, and information on the desire to perform D2D communication.

It is noted that the above-described "connected state of the UE 100" is the connected state of the UE 100 when the UE count counting request is received. Alternatively, if a UE 100 in the idle state establishes a temporary connection for responding to the UE count counting request, and thereafter, terminates the connection, the connected state of the UE 100 is the idle state. On the other hand, if a UE 100 in the idle state continues with the connection after responding to the UE count counting request, the connected state of the UE 100 is the RRC connection state.

Further, the information on the desire to perform D2D communication, for example, includes information requesting calling via D2D communication, information requesting the acquisition of advertising information via D2D communication, and information requesting the acquisition of information about a terminal (store) that transmits advertising information via D2D communication. Each of these requests may be counted.

In step S222, the eNB 200 starts a timer.

In step S223, the eNB 200 receives a UE count counting request response from the UE 100. On the other hand, the UE 100 transmits the UE count counting request response. The UE count counting request response may include information indicating the identifiers of the UE and the above-described attributes of the UE.

After the timer in step S222 terminates, the eNB 200 executes the processing in step S224.

In step S224, the eNB 200 aggregates the number of UEs on the basis of the UE count counting request response. The eNB 200 may count the number of identifiers of the UE, or may categorize the number of UEs in detail, and aggregate them, as illustrated in FIGS. 12(A) to 12(D), on the basis of the information indicating the attributes of the UE. The eNB 200 determines the UE count information on the basis of the aggregation result.

In step S225, the eNB 200 broadcasts the determined UE count information.

Next, the second method is a method of acquisition of the terminal count information, by the eNB 200, from a network device (server) in which location of the UE 100 is registered.

Figure 14:
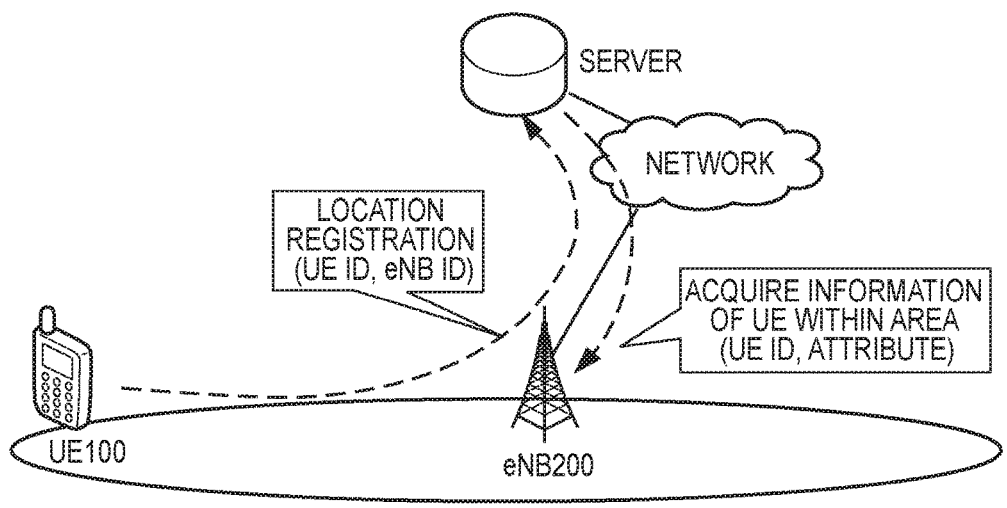
FIG. 14 is an explanatory diagram for describing a method for determination of UE count information by the eNB 200 in the operation 2 of the mobile communication system according to the embodiment.

As illustrated in FIG. 14, when the UE 100 moves inside a cell managed by the eNB 200, the UE 100 connects to the eNB 200 at least temporarily. The UE 100 establishes a temporary connection even if the UE 100 is in an idle state. After the UE 100 connects to the eNB 200, the UE 100 registers location information in a server (for example, a network device such as MME). The UE 100 registers the identifiers of the UE and location information of the UE 100 (for example, the identifier of the eNB 200). During location registration, the UE 100 may register information indicating the attributes of the UE. It is noted that when the UE 100 establishes a temporary connection, and thereafter, terminates the connection, the UE 100 may register information indicating the idle state.

Figure 15:
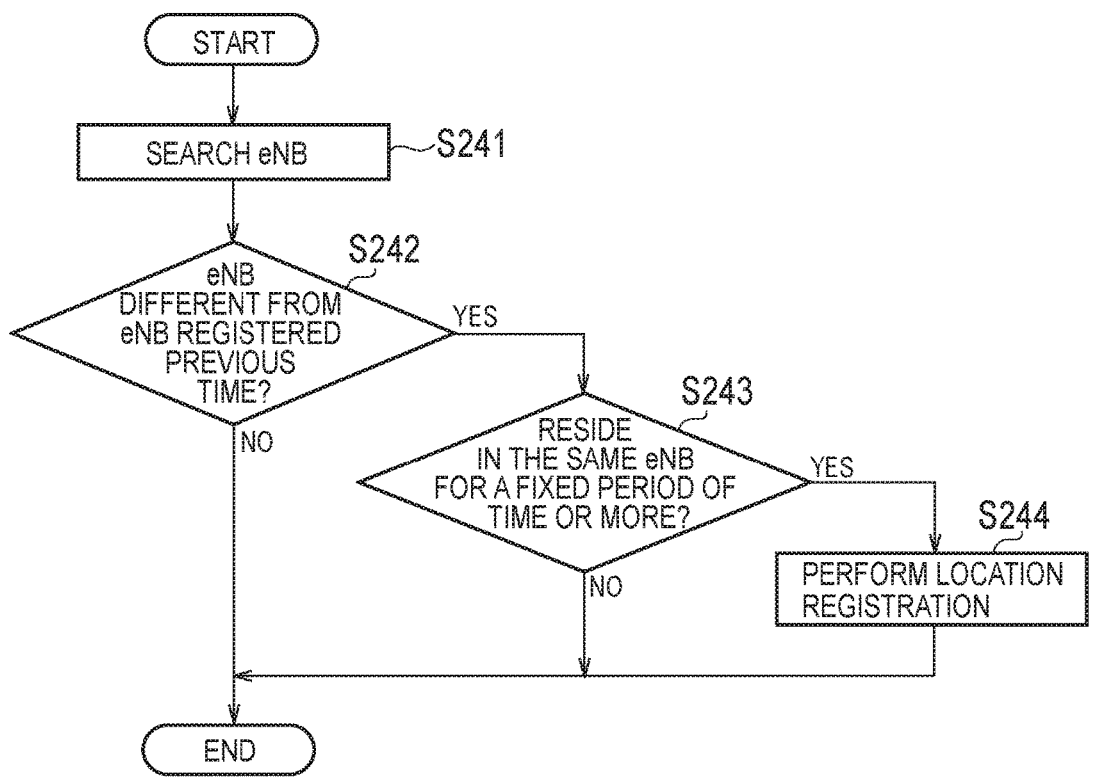
FIG. 15 is a flowchart illustrating a location registration operation of the UE 100 in the operation 2 of the mobile communication system according to the embodiment.

Further, as illustrated in FIG. 15, the UE 100 in the idle state executes the processing described below.

In step S241, the UE 100 searches the eNB 200.

In step S242, if the eNB 200 detected through search is an eNB 200 different from the eNB 200 for which location registration is performed the previous time (in the case of "YES"), the UE 100 executes the processing of step S243. On the other hand, if the detected eNB 200 is the same as the eNB 200 for which location registration is performed the previous time (in the case of "NO"), the UE 100 terminates the processing.

In step S243, the UE 100 determines whether or not the UE 100 resides in the same (cell managed by the) eNB 200 for a fixed period of time or more. If the residing time is equal to or more than a threshold value indicating a fixed period of time (in the case of "YES"), the UE 100 executes the processing of step S244. On the other hand, if the residing time is less than the threshold value (in the case of "NO"), the UE 100 terminates the processing.

In step S244, the UE 100 registers, in the server, an identifier of the eNB 200 in which the UE 100 resides, as new location information of the UE 100.

On the other hand, the eNB 200 acquires the location information (and information indicating the attributes of the UE) from the server. The eNB 200 determines the terminal count information on the basis of the acquired location information (and information indicating the attributes of the UE).

(3) Operation 3

Figure 16:
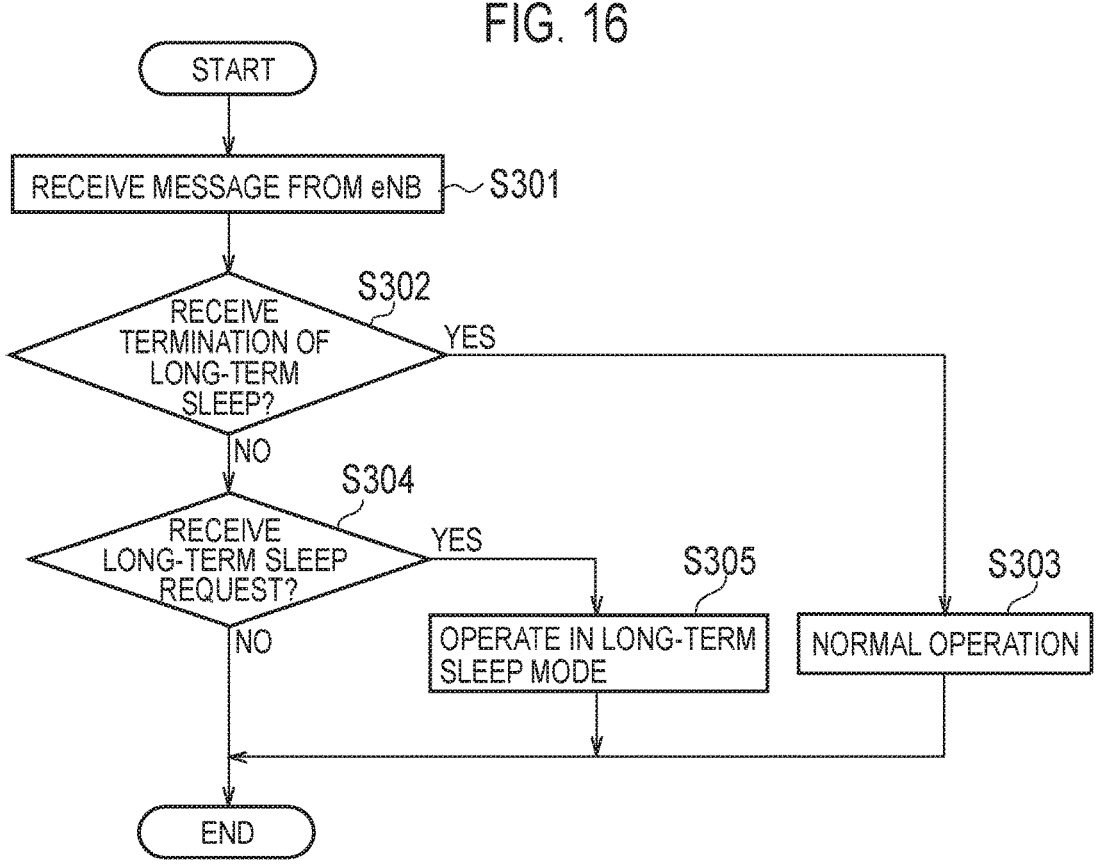
FIG. 16 is a flowchart (part 1) illustrating an operation of the UE 100 in an operation 3 of the mobile communication system according to the embodiment.
Figure 17:
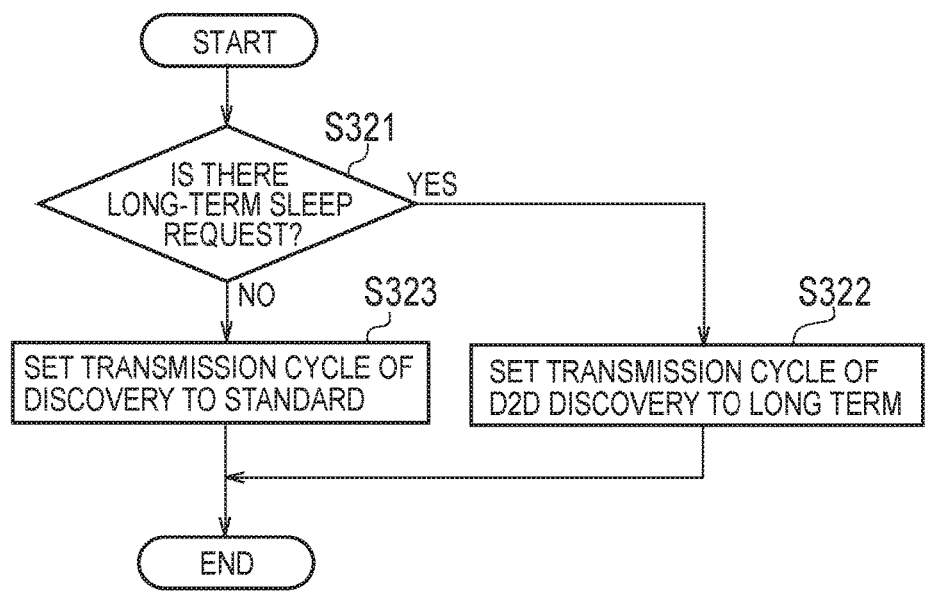
FIG. 17 is a flowchart (part 2) illustrating an operation of the UE 100 in the operation 3 of the mobile communication system according to the embodiment.

Next, an operation 3 will be described by using FIG. 16 and FIG. 17. FIG. 16 is a flowchart (part 1) illustrating an operation of the UE 100 in the operation 3 of the mobile communication system according to the embodiment. FIG. 17 is a flowchart (part 2) illustrating an operation of the UE 100 in the operation 3 of the mobile communication system according to the embodiment.

It is noted that a description will be provided while focusing on a portion different from the above-described operation 1 and operation 2, and a description of a similar portion will be omitted, where necessary.

In the operation 1, the eNB 200 reduces the transmission power of the radio signal as an operation for energy saving. On the other hand, in the operation 3, as an operation for energy saving, the eNB 200 transmits a request for switching the operation mode to the UE 100.

For example, an advertiser requests a communication carrier (carrier) to stop (or resume) a designated fixed-type UE 100 that distributes advertising information via D2D communication in a predetermined designated time. Accordingly, a network requests the eNB 200 in which the designated fixed-type UE 100 exists to transmit a request for switching the operation mode to the designated fixed-type UE 100.

First of all, a first operation of the UE 100 in the operation 3 will be described. In the first operation, the eNB 200 transmits by unicast a request (message) for switching the operation mode. For example, the message is composed of an identifier of the UE 100, and a flag indicating whether long-term sleep is ON or OFF.

As illustrated in FIG. 16, in step S301, the UE 100 receives a message from the eNB 200 by unicast.

In step S302, the UE 100 determines whether or not the received message is a request for switching the operation mode from the power saving mode (long-term sleep mode) to the normal mode. That is, when the UE 100 receives a message requesting termination of long-term sleep (in the case of "YES"), the UE 100 executes the processing of step S303. On the other hand, when the UE 100 does not receive a message requesting termination of long-term sleep (in the case of "NO"), the UE 100 executes the processing of step S304.

Step S303 corresponds to step S104.

In step S304, the UE 100 determines whether or not the received message is a request for switching the operation mode from the normal mode to the power saving mode. That is, when the UE 100 receives a message requesting commencement of long-term sleep (in the case of "YES"), the UE 100 executes the processing of step S305. On the other hand, when the UE 100 does not receive a message requesting commencement of long-term sleep (in the case of "NO"), the UE 100 terminates the processing.

Step S305 corresponds to step S103.

Next, a second operation of the UE 100 in the operation 3 will be described. In the second operation, the eNB 200 transmits by broadcast a request for switching the operation mode. The eNB 200 may transmit a request including restriction information of the discovery operation (for example, the transmission cycle of the discovery signal and/or the transmission bandwidth of the discovery signal) that is applied in the power saving mode. For example, upon being requested to set a cell to OFF (or ON) by the network (see above-described "(1) Operation 1"), the eNB 200 changes the content of a broadcast message (for example, an SIB) instructing the transmission cycle of the discovery signal and the transmission bandwidth of the discovery signal. For example, upon being requested to set a cell to OFF by the network, the eNB 200 changes the content of the broadcast message so that the transmission cycle of the discovery signal becomes longer (so as to switch the operation mode to the power saving mode). On the other hand, upon being requested to set a cell to ON by the network, the eNB 200 changes the content of the broadcast message so as to return the transmission cycle of the discovery signal to the original length (so as to switch the operation mode to the normal mode).

It is noted that in order to enable control to be performed according to the type of D2D communication, the eNB 200 may transmit a broadcast message including information indicating the attributes of D2D communication for designating a target UE (such as a UE performing the discovery processing for calling via D2D communication, a UE performing the discovery processing for acquiring (or distributing) the advertising information via D2D communication, or a UE performing the discovery processing for acquiring information about a terminal (store) that transmits the advertising information via D2D communication), in addition to information instructing the transmission cycle of the discovery signal and the transmission bandwidth of the discovery signal.

As illustrated in FIG. 17, in step S321, the UE 100 determines whether or not a message received from the eNB 200 is a request for switching the operation mode from the normal mode to the power saving mode (long-term sleep mode). That is, when the UE 100 receives a message requesting long-term sleep (in the case of "YES"), the UE 100 executes the processing of step S322. On the other hand, when the UE 100 does not receive a message requesting long-term sleep (in the case of "NO"), the UE 100 executes the processing of step S323.

In step S322, the UE 100 sets the transmission cycle of the discovery signal to Long Term on the basis of the restriction information included in the message.

On the other hand, in step S323, the UE 100 sets the transmission cycle of the discovery signal to Standard on the basis of the restriction information included in the message.

Summary of Embodiment

In the present embodiment, the eNB 200 managing a cell in which the fixed-type UE 100 exists performs the operation for energy saving. When the eNB 200 performs the operation for energy saving, the UE 100 switches the operation mode from normal mode to power saving mode. Thus, in the power saving mode, power consumption is suppressed more than in the normal mode, and as a result, it is possible to restrain unnecessary power consumption based on the discovery operation of the fixed-type UE 100.

In the present embodiment, as an operation for energy saving, the eNB 200-1 reduces the transmission power of the radio signal. When the received power of the radio signal from the eNB 200-1 becomes equal to or less than a threshold value, the UE 100 switches the operation mode from the normal mode to the power saving mode. Alternatively, when the received power of the radio signal from the eNB 200-2 becomes equal to or more than the threshold value, the UE 100 switches the operation mode from the normal mode to the power saving mode.

Here, as a case in which the eNB 200-1 performs the operation for energy saving, a case in which the traffic in the eNB 200-1 is less, that is, a case in which the number of UEs performing communication with the eNB 200-1 is less, is assumed. In such a case, it is assumed that the number of UEs that exist in a cell managed by the eNB 200-1 is less. Therefore, in such a case, the UE 100 is capable of restraining unnecessary power consumption based on the discovery operation by switching the operation mode from the normal mode to the power saving mode.

In the present embodiment, the UE 100 sets, as the designated eNB, the eNB 200-1 (or the eNB 200-2) transmitting the radio signal whose received power becomes maximum in a predetermined time period. When the eNB 200-1 performs the operation for energy saving (or when the received power of the radio signal from the eNB 200-2 becomes equal to or more than a threshold value), the UE 100 switches the operation mode from the normal mode to the power saving mode. Even when the received power of the radio signal from the eNB 200-1 (or the eNB 200-2) is no longer the maximum received power, the UE 100 maintains the eNB 200-1 as the designated eNB. Thus, the UE 100 is capable of autonomously setting the designated eNB.

In the present embodiment, as an operation for energy saving, the UE 100 transmits, to the UE 100, the UE count information on the number of UEs 100 located in a self-cell. The UE 100 switches the operation mode from the normal mode to the power saving mode on the basis of the UE count information. Further, the UE count information is information about at least any one of the total number of UEs located in a cell, the number of UEs per unit area, the number of UEs per unit transmission power, the number of UEs in the connected state, the number of UEs in the idle state, the number of fixed-type UEs, and the number of UEs that desire to perform D2D communication. Thus, when the UE 100 determines that the number of UEs in the cell in which the UE 100 exists is less, the UE 100 is capable of restraining unnecessary power consumption based on the discovery operation by switching the operation mode to the power saving mode.

In the present embodiment, the eNB 200 broadcasts request information requesting the information for obtaining the UE count information. The eNB 200 obtains the UE count information on the basis of a response to the request information. Further, the information for obtaining the UE count information is at least any one of information indicating the connected state of the UE, information indicating whether or not the UE is a fixed-type UE, and information on the desire to perform D2D communication. Thus, the UE 100 is capable of acquiring the information on the number of UEs located in the cell, and therefore, when the probability of existence of a UE near the UE 100 is less, the UE 100 is capable of restraining unnecessary power consumption based on the discovery operation.

In the present embodiment, when the UE 100 moves inside the cell, the UE 100 registers the location information of the UE 100 in the server. The eNB 200 acquires the location information registered in the server from the server. The eNB 200 obtains the UE count information on the basis of the acquired location information. Thus, the UE 100 is capable of acquiring the information on the number of UEs located in the cell, and therefore, when the probability of existence of a UE near the UE 100 is less, the UE 100 is capable of restraining unnecessary power consumption based on the discovery operation.

In the present embodiment, as an operation for energy saving, the eNB 200 transmits, to the UE 100, a request for switching from the normal mode to the power saving mode. The UE 100 switches the operation mode to the power saving mode on the basis of the request. Thus, the UE 100 is capable of restraining unnecessary power consumption based on the discovery operation.

In the present embodiment, the eNB 200 transmits a request including the restriction information of the discovery operation that is applied when the operation mode is the power saving mode. Thus, the UE 100 is capable of restraining unnecessary power consumption based on the discovery operation on the basis of the restriction information.

Other Embodiments

As described above, the present invention has been described with the embodiment. However, it should not be understood that those descriptions and drawings constituting a part of the present disclosure limit the present invention. From this disclosure, a variety of alternate embodiments, examples, and applicable techniques will become apparent to one skilled in the art.

For example, in the operation 1 in the above-described embodiment, an RSRQ indicating reception quality may be used instead of RSRP.

Further, in the operation 1 in the above-described embodiment, in step S102, the UE 100 performs the operation for switching to the power saving mode when it is not possible to detect the designated eNB; however, the UE 100 may perform the operation for switching to the power saving mode even when it is possible to detect the designated eNB (for example, when the designated eNB is the eNB 200-2 performing cell extension).

Further, in the above-described embodiment, operations 1 through 3 may be combined and executed, where necessary.

In the above-described embodiment, a discovery operation is described as the operation in the D2D proximity service; however, this is not limiting. In the above-described embodiment, the "discovery operation" may be replaced by a "transmission operation of a D2D synchronization signal". Hereinafter, the transmission operation of a D2D synchronization signal will be described.

The D2D proximity service (D2D ProSe) is a service enabling direct UE-to-UE communication within a synchronization cluster including a plurality of synchronized UEs 100. The D2D proximity service includes a D2D discovery procedure (Discovery) in which a proximal UE corresponding to the above-described discovery operation is discovered, and D2D communication (Communication) that is direct UE-to-UE communication. The D2D communication is also called Direct communication.

A scenario in which all the UEs 100 forming the synchronization cluster are located in a cell coverage is called "In coverage". A scenario in which all the UEs 100 forming the synchronization cluster are located out of a cell coverage is called "Out of coverage". A scenario in which some UEs 100 in the synchronization cluster are located in a cell coverage and the remaining UEs 100 are located out of the cell coverage is called "Partial coverage".

In the case of Out of coverage or Partial coverage, the UE 100 (fixed UE 100) acts as a D2D synchronization source. In the case of Out of coverage, the UE 100, which is a D2D synchronization source, transmits a D2D synchronization signal. The D2D synchronization signal is a signal transmitted in a D2D synchronization procedure in which terminal-to-terminal synchronization is established. The D2D synchronization signal includes a D2DSS and a physical D2D synchronization channel (PD2DSCH). The D2DSS is a signal for providing a synchronization standard of a time and a frequency. The PD2DSCH is a physical channel through which more information is conveyed than the D2DSS. The PD2DSCH conveys the above-described D2D resource information (Discovery resource information, Communication resource information). Alternatively, when the D2DSS is associated with the D2D resource information, the PD2DSCH may be rendered unnecessary. The UE 100 located out of cell coverage, which is a D2D asynchronization source, is in sync with the D2D synchronization source on the basis of the received D2D synchronization signal.

For example, when the operation mode is set to the power saving mode, the UE 100, which is the D2D synchronization source, drops the frequency of the transmission operation of the D2D synchronization signal (lengthens the transmission cycle of the D2D synchronization signal), or reduces the amount of transmission information in the D2D synchronization signal. Further, the power saving mode may be a long-term sleep mode in which the UE 100 stops the transmission operation of the D2D synchronization signal until the eNB 200-1 terminates the operation for energy saving.

Therefore, when the operation mode is set to the power saving mode, the UE 100 may restrain unnecessary power consumption based on both operations, that is, the discovery operation and the transmission operation of the D2D synchronization signal, or may restrain unnecessary power consumption based on either the discovery operation or the transmission operation of the D2D synchronization signal.

In the above-described embodiment, an example in which the present invention is applied to the LTE system has been described; however, the present invention may also be applied to systems, other than the LTE system, as well as the LTE system.

In addition, the entire content of Japanese Patent Application No. 2013-244346 (filed on Nov. 26, 2013) is incorporated in the present specification by reference.

INDUSTRIAL APPLICABILITY

As described above, the communication control method, the user terminal, and the processor according to the present invention are able to restrain the unnecessary power consumption based on the discovery operation of the user terminal whose movement is restricted, and thus they are useful in a mobile communication field.

The invention claimed is:

1. A communication control method used in a mobile communication system that supports a D2D proximity service, comprising:
   performing, by a base station, energy saving that reduces transmission power of a radio signal, the base station managing a cell in which a user terminal, whose movement is restricted, exists;
   receiving, by the user terminal, the radio signal from the base station performing the energy saving;
   determining, by the user terminal, whether the base station is performing the energy saving, based on reduced transmission power of the received radio signal, the determining comprising determining that the base station is performing the energy saving in response to detection of the reduced transmission power of the received radio signal;
   switching, by the user terminal, an operation mode from a normal mode, in which the user terminal performs its normal operation, to a power saving mode, in which the user terminal reduces power consumption of an operation in the D2D proximity service to be less than power consumption of the operation in the D2D proximity service in the normal mode, when the user terminal determines that the base station is performing the energy saving;
   prior to the performing the energy saving, setting, by the user terminal, the base station transmitting the radio signal whose received power becomes maximum in a predetermined time period as a designated base station, wherein
   in the switching, when the base station set as the designated base station performs the energy saving, the user terminal switches the operation mode from the normal mode to the power saving mode, and
   the communication control method further comprises:
   maintaining, by the user terminal, the base station as the designated base station even when the received power of the radio signal from the base station is no longer the maximum received power, wherein
   the operation in the D2D proximity service is at least one of a discovery operation for discovering a partner terminal in D2D communication or for being discovered by the partner terminal, and a transmission operation of a synchronization signal for establishing terminal-to-terminal synchronization.

2. The communication control method according to claim 1, wherein
   in the switching, when received power of the radio signal becomes equal to or less than a threshold value, the user terminal switches the operation mode from the normal mode to the power saving mode.

3. The communication control method according to claim 1, wherein
   in the switching, when received power of the radio signal from a neighboring base station becomes equal to or more than a threshold value as a result of the energy saving, the user terminal switches the operation mode from the normal mode to the power saving mode.

4. The communication control method according to claim 3, comprising:
   prior to the performing the energy saving, setting, by the user terminal, the neighboring base station transmitting the radio signal whose received power becomes maximum in the predetermined time period as the designated base station, wherein
   in the switching, when the received power of the radio signal from the neighboring base station set as the designated base station becomes equal to or more than the threshold value, the user terminal switches the operation mode from the normal mode to the power saving mode, and
   the communication control method further comprises
   maintaining, by the user terminal, the neighboring base station as the designated base station even when the received power of the radio signal from the neighboring base station is no longer the maximum received power.

5. The communication control method according to claim 1, further comprising:
   transmitting, by the base station, to the user terminal, terminal count information on the number of user terminals located in the cell, wherein
   in the switching, the user terminal switches the operation mode from the normal mode to the power saving mode on a basis of the terminal count information received from the base station.

6. The communication control method according to claim 5, wherein
the terminal count information is information about at least any one of the total number of user terminals located in the cell, the number of user terminals per unit area, the number of user terminals per unit transmission power, the number of user terminals in a connected state, the number of user terminals in an idle state, the number of user terminals whose movements are restricted, and the number of user terminals that desire to perform D2D communication.

7. The communication control method according to claim 5, further comprising:
broadcasting, by the base station, request information requesting information for obtaining the terminal count information; and
obtaining, by the base station, the terminal count information on a basis of a response to the request information.

8. The communication control method according to claim 7, wherein
the information for obtaining the terminal count information is at least any one of information indicating a connected state of a user terminal, information indicating whether or not a user terminal is a user terminal whose movement is restricted, and information on desire to perform the D2D communication.

9. The communication control method according to claim 5, further comprising:
registering, by the user terminal, location information of the user terminal in an upper network device than the base station, when the user terminal moves inside the cell;
acquiring, by the base station, from the network device, the location information registered in the network device; and
obtaining, by the base station, the terminal count information on a basis of the acquired location information.

10. The communication control method according to claim 1, further comprising
transmitting, by the base station, to the user terminal, a request for switching the operation mode from the normal mode to the power saving mode, and
in the switching, the user terminal switches the operation mode from the normal mode to the power saving mode on a basis of the request received from the base station.

11. The communication control method according to claim 10, wherein
in the transmitting, the base station transmits the request including restriction information of at least one of the discovery operation and the transmission operation of the synchronization signal, the restriction information being applied when the operation mode is the power saving mode.

12. A user terminal configured to be a user terminal whose movement is restricted and to be used in a mobile communication system that supports a D2D proximity service, comprising:
a controller comprising a processor configured to
receive a radio signal from a base station managing a cell in which the user terminal exists and performing energy saving that reduces transmission power of a radio signal,
determine whether the base station is performing the energy saving based on reduced transmission power of the received radio signal, wherein the processor determines that the base station is performing the energy saving in response to detection of the reduced transmission power of the received radio signal,
switch an operation mode from a normal mode, in which the user terminal performs its normal operation, to a power saving mode, in which the user terminal reduces power consumption of an operation in the D2D proximity service to be less than power consumption of the operation in the D2D proximity service in the normal mode when the user terminal determines that the base station is performing the energy saving,
set the base station transmitting the radio signal whose received power becomes maximum in a predetermined time period as a designated base station,
switch the operation mode from the normal mode to the power saving mode, when the base station set as the designated base station performs the energy saving, and
maintain the base station as the designated base station even when the received power of the radio signal from the base station is no longer the maximum received power, wherein
the operation in the D2D proximity service is at least one of a discovery operation for discovering a partner terminal in D2D communication or for being discovered by the partner terminal, and a transmission operation of a synchronization signal for establishing terminal-to-terminal synchronization.

13. The user terminal according to claim 12, wherein when received power of a radio signal from the base station becomes equal to or less than a threshold value, the controller switches the operation mode from the normal mode to the power saving mode.

14. The user terminal according to claim 12, wherein when received power of a radio signal from a neighboring base station becomes equal to or more than a threshold value as a result of the energy saving, the controller switches the operation mode from the normal mode to the power saving mode.

15. The user terminal according to claim 14, wherein
the controller sets the neighboring base station transmitting the radio signal whose received power becomes maximum in the predetermined time period as the designated base station,
the controller switches the operation mode from the normal mode to the power saving mode, when the received power of the radio signal from the neighboring base station set as the designated base station becomes equal to or more than the threshold value, and
the controller maintains the neighboring base station as the designated base station even when the received power of the radio signal from the neighboring base station is no longer the maximum received power.

16. The user terminal according to claim 12, further comprising:
a receiver configured to receive, from the base station, terminal count information on the number of user terminals located in the cell, wherein
the controller switches the operation mode from the normal mode to the power saving mode on a basis of the terminal count information received from the base station.

17. The user terminal according to claim 12, further comprising:
a receiver configured to receive, from the base station, a request for switching, by the user terminal, the operation mode from the normal mode to the power saving mode, wherein the controller switches the operation mode from the normal mode to the power saving mode on a basis of the request received from the base station.

* * * * *